Patented Mar. 8, 1938

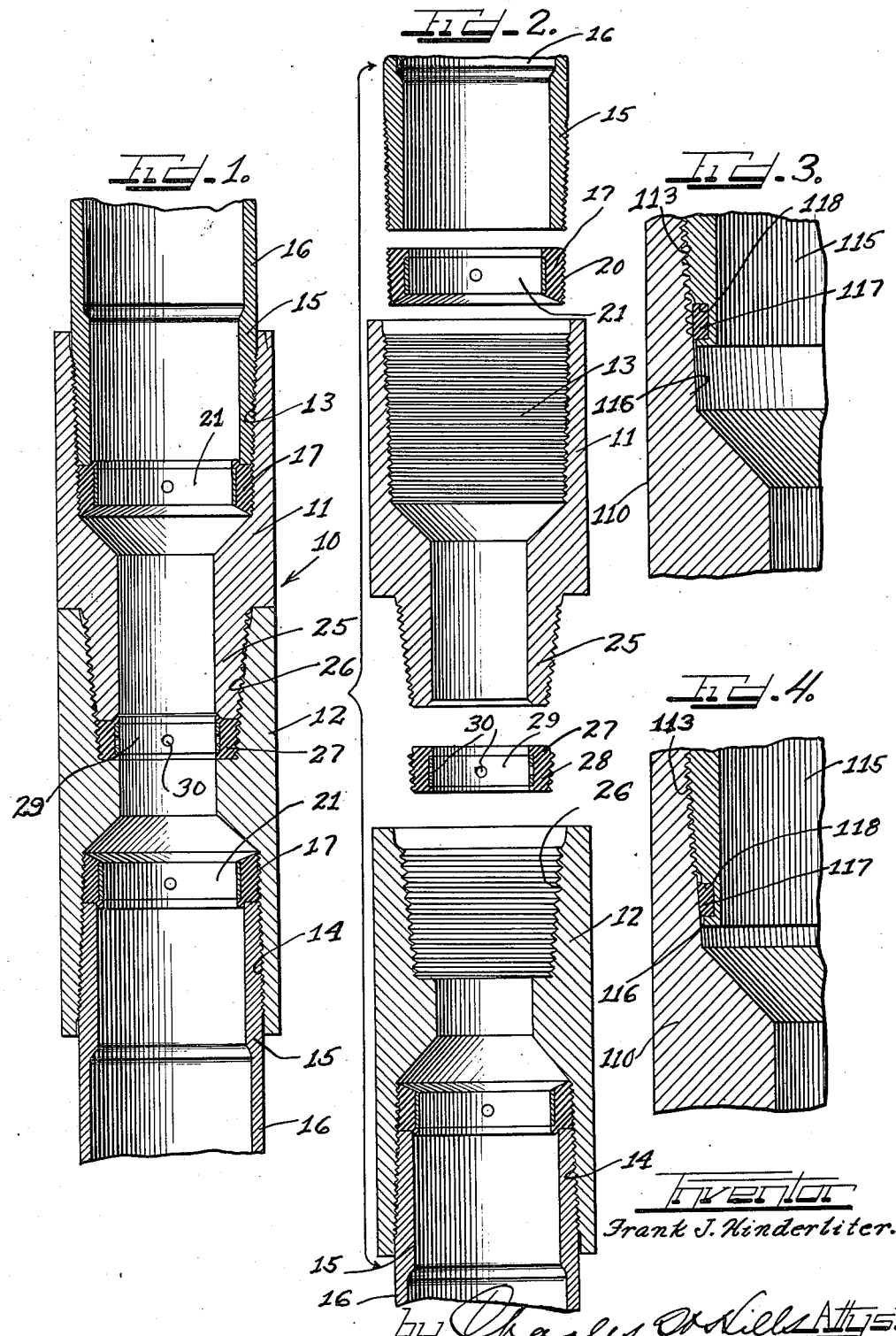

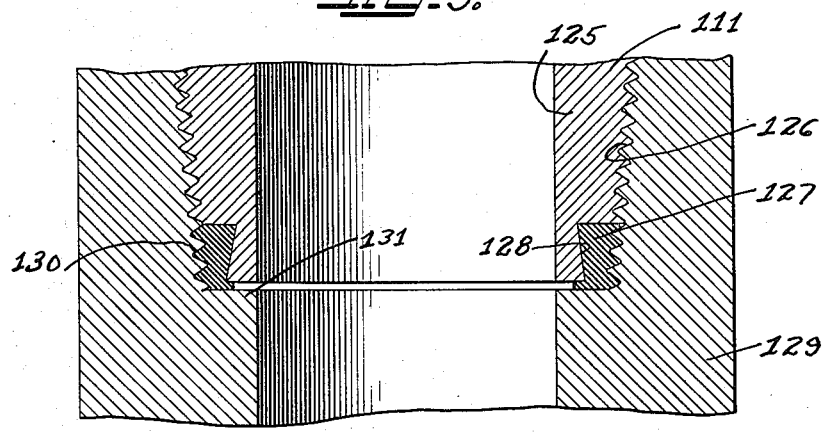
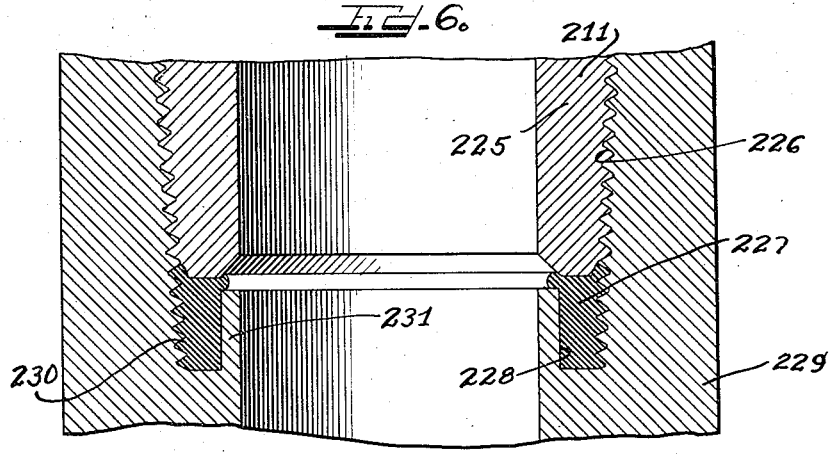
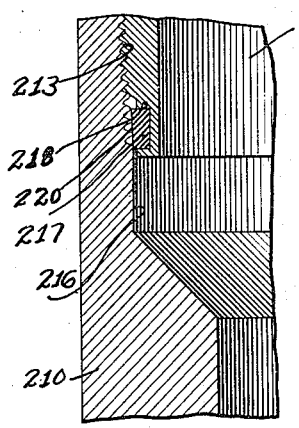
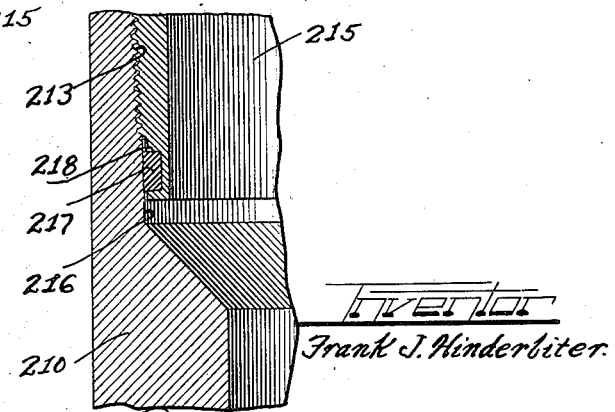

2,110,127

UNITED STATES PATENT OFFICE 2,110,127

ROTARY TOOL JOINT

Frank J. Hinderliter, Tulsa, Okla.

Application July 15, 1935, Serial No. 31,329

4 Claims. (Cl. 285—146)

This invention relates to sealing means for tool joints and more particularly to a rotary tool joint for use with drill pipes of the same general character as that disclosed in my issued patent, Re. 19,196, granted June 5, 1934.

An object of this invention is to provide improved sealing means for use in a rotary tool joint.

Another object of this invention is to provide a tool joint with sealing means which is easier to dispose in a sealing position in the joint.

In accordance with the general features of this invention, there is provided a tool joint including pin and box members each having pipe sockets with sealing means therein and the box member having a pin socket with sealing means therein, said sealing means being adapted to be screwed into a properly seated position in the bottom of each of the sockets.

In accordance with another form of the invention, the sealing means is brought into a properly seated position on the bottom of the socket of the tool joint by the act of threading the insert or the male member into the socket.

Other objects and features of this invention will more fully appear from the following detail description taken in connection with the accompanying drawings which illustrate several embodiments thereof and in which—

Figure 1 is a fragmentary sectional view taken through a tool joint embodying the features of this invention showing it connected to the upset ends of drill pipes.

Figure 2 is a view similar to Fig. 1 but illustrating the pin and box members as being separated with a sealing ring therebetween and also showing one of the upset pipe ends and its sealing means disconnected from the pipe socket in the pin member.

Figure 3 is a sectional view similar to a portion of Fig. 1 illustrating a modification of the invention and showing the male member and its sealing means in a position just above the sealing position.

Figure 4 is a view similar to Fig. 3, showing the sealing means in its properly seated and wedged position.

Figure 5 is a sectional view of a modification of the invention, showing a modified form of sealing means between the pin and box members of the joint.

Figure 6 is a sectional view similar to Fig. 5, showing a still further modified form of sealing means between the box and pin members of the joint.

Figure 7 is a sectional view similar to Fig. 3, illustrating another form of sealing means in a position ready to be wedged into sealing engagement with the bottom of the socket, and Figure 8 is a sectional view similar to Fig. 7, showing the sealing means in its wedged or sealing position.

As shown on the drawings:

The reference character 10 designates generally a rotary tool joint including a pin member 11 and a box member 12, each of which has at its outer end a threaded socket 13—14 into which an upset end 15 of a drill pipe 16 is adapted to be screwed.

In the bottom of each of the sockets 13 and 14 there is disclosed a sealing ring 17—17 which may be made of any suitable resilient material, such for example as rubber. This rubber ring has its outer periphery threaded to correspond with the threads of the socket 13—14 so that the ring may be threaded to a seated position in the bottom of the socket. These threads are designated by the reference character 20 in Fig. 2. Also the inner periphery of the rubber ring 17 is provided with a reinforcing steel band 21 which comprises a unitary part of the ring and may be molded with or otherwise secured to the ring so as to constitute a component thereof. The purpose of this steel band 21 is to confine the displacement of the rubber and to prevent the rubber from being displaced inwardly of the ring. It has been my experience that unless some reinforcing means is provided for the ring, there is a likelihood for the mud laden fluid under pressure being circulated through the pipes and joints to unseat the rubber.

The inserting thrust of the upset pipe end 15 will of course press the rubber ring downwardly into tight engagement with the threaded bottom of the socket and will cause the outer end of the rubber ring to be displaced or distorted as shown in Fig. 1 whereby a tight seal is provided.

The pin member 11 has a tapered threaded shank 25 adapted to be screwed into a tapered threaded socket 26 in the box member 12. Positioned on the bottom of the socket 26 is a rubber sealing ring 27 which is illustrated out of the socket in Fig. 2. This rubber ring 27 has its outer periphery 28 threaded so that it can be screwed into the bottom of the socket. The inner periphery of the ring is provided with a reinforcing steel band 29 which may be molded or otherwise secured in the rubber ring. The purpose of this band is the same as that of the band 21. Also this band as well as the band 21 may be provided with an aperture 30 to accommodate the ends of a suitable tool for threading the sealing ring into the bottom of the socket.

When the rubber ring 27 is compressed by the inserting thrust of the threaded shank 25 of the pin member, it will assume somewhat the position illustrated in Fig. 1. That is to say, its outermost end will be distorted or displaced into tight sealing engagement with the lower end of the male portion or shank 25.

From the foregoing it will be apparent that the rings 17 and 27 are easy to dispose in a proper sealing position in the bottom of each of the sockets by merely screwing these sealing rings into the threaded lower ends of the sockets. Moreover, when they are subjected to the inserting thrust of the male member screwed into the socket, the threads on the outer periphery of each of these rings will be tightly compressed against the corresponding threads of the bottom of the socket engaged thereby. This provides a tortuous path through which any fluid must travel in order for such fluid to leave the joint. The seal afforded by the engagement of these teeth is also augmented by the displacement of the outer end of the rubber ring by reason of the inserting thrust of the male member inserted in the socket. Thus a seal is not only provided along the threaded portion of the bottom of the socket but in addition thereto a seal is provided at the outer end of the ring where it is engaged by the inserted male member.

Incidentally, the openings 30 also allow the fluid under pressure in the joint to act on an intermediate portion of the ring as well as on the outer end of the ring which is in engagement with the end of the inserted male member. The pressure of the mud-laden fluid will naturally tend to press the rubber into tighter sealing engagement.

In Figs. 3 and 4 is illustrated a modification in which the male member 115 which may correspond to either the upset end of a pipe or the threaded shank of a pin member is screwed into a tapered socket 113 in a tool joint member 110. The lower end of the tapered socket 113 is not threaded but instead is provided with a tapered or inclined smooth wall 116 adapted to wedgingly cooperate with a rubber sealing ring 117 disposed in an annular groove 118 in the lower end of the male member 115.

The ring 117 may be made of any suitable resilient material, such as rubber, and is preferably flexed or snapped into tight retained engagement in the groove 118.

By reason of the fact that the socket 113 is tapered, the rubber ring 117 is enabled to clear the threads until it reaches the bottom of the socket. When this ring comes into engagement with the inclined wall 116, the inserting thrust of the male member will cause it to be wedged into tight sealing engagement with the inclined or tapered wall 116 as shown in Fig. 4. Thus I have provided a structure wherein the sealing means is disposed in the socket in proper sealing condition by the mere act of screwing the threaded male member into the socket.

In Fig. 5 I have illustrated another modification of the invention in which the pin member 111 has a threaded shank 125 screwed into a tapered threaded socket 126 in a box member 129.

The lower end of the shank 125 has a dovetailed shaped groove 128 in which is seated a sealing or rubber ring 127. This ring may be flexed or snapped into tight engagement with the grooved end of the shank 125 so as to become a unitary part of that shank. In addition thereto, the outer periphery of the ring is provided with a plurality of threads 130 corresponding with the threads on the shank so that this rubber ring can be threaded into the bottom of the socket until it comes into engagement with the shoulder 131 in the box member 129.

In this form of the invention as in the previously described one, the sealing ring is disposed in proper sealing position in the bottom of the socket by the act of screwing the pin member into the socket of the box member. The two members are tightened until their shoulders engage at which time the rubber ring is tightly pressed or wedged into sealing engagement with the bottom of the socket as shown in Fig. 5. The rubber ring has a cross sectional area which is greater than that of the groove 128 so that it extends beyond the lower end of the shank 125. As a result thereof, the innermost portion of the ring must of necessity be displaced by the inserting thrust of the pin member whereby this portion is crowded along the shoulder 131 between that shoulder and the lower end of the shank 125.

The slight space separating the end of the shank 125 from the shoulder 131 also allows the fluid under pressure flowing through the joint to act on the exposed portion of the rubber ring between the shank and shoulder. Thus the fluid under pressure is also utilized to aid in the maintenance of the seal between the male and female members of this joint construction.

In Fig. 6 another form of the invention is illustrated in which the rubber ring 227 is screwed into the bottom of the socket 226 of box member 229 instead of being carried by the shank 225 of the pin member 211.

The bottom of the threaded tapered socket 226 is provided with an upstanding annular rib or flange 231 which serves to confine the displacement of the rubber ring 227. It moreover cooperates with the threaded wall of the socket to define a groove 228 in which the rubber ring 227 is screwed. The rubber ring 227 has threads 230 in its outer periphery corresponding with the teeth or threads on the shank 225 so that it may be screwed into the socket 226.

After this rubber ring has been screwed into the socket, the threaded shank 225 is then inserted in the socket and its inserting thrust forces the rubber ring into a tight sealing position as shown in Fig. 6. In this position, a portion of the outer end of the ring is displaced around the inner end of the shank 225 so as to be in tight sealing engagement therewith.

The modification of the invention illustrated in Figs. 7 and 8 is similar to that shown in Figs. 3 and 4 with the exception that in this form of the invention the outer periphery of the rubber sealing ring 217 is inclined or tapered and the wall 216 is substantially straight.

The rubber sealing ring 217 is seated in a groove 218 in the lower end of the tapered threaded male member 215 screwed into the tapered threaded socket 213 of the tool joint member 210.

The outer periphery of this rubber ring 217 is inclined upwardly and outwardly from the lower end of the shank 215 as indicated at 220. The bottom of the socket 213 terminates in a substantially straight wall 216 adapted to wedgingly cooperate with the sealing ring 217.

In Figure 7 I have illustrated the condition of the rubber sealing ring 217 prior to its being wedged or crowded down the wall 216, whereas in Figure 8 I have illustrated its position after it is wedged into contact with the wall 216 by the inserting thrust of the male member 215.

Now, I desire it understood that while I have illustrated and described in detail several forms of the invention, the invention is not to be thus limited, but only insofar as defined by the scope and spirit of the appended claims.

I claim as my invention:

1. In a rotary tool joint including box and pin members which have a threaded socket for receiving a male part, a sealing ring of resilient material carried by the male part and having threads on its outer periphery for enabling it to be screwed into the bottom of the socket, said ring being tightly disposed in a groove on the lower end of the male part so that it may be screwed into the socket at the same time that the male part is inserted therein.

2. In a rotary drilling rig, including a plurality of stands of pipe, means including tool joints for connecting the stands of pipe together, and sealing means in each joint arranged to be pressed into sealed tight engagement with the walls of the joint, said sealing means comprising a resilient ring carried by an end of a pipe so that as the pipe is threaded into the socket of the joint, the ring is also threaded into tight sealing engagement with the bottom of the socket.

3. In a rotary tool joint including box and pin members which have a threaded socket for receiving a male part, a sealing ring of resilient material carried by the male part and having threads on its outer periphery for enabling it to be screwed into the bottom of the socket, a portion of said ring being adapted to be displaced laterally upon assembly of said members, thereby to increase the effective sealing area of said sealing ring.

4. In a rotary tool joint including box and pin members which have a threaded socket for receiving a male part, a sealing ring of resilient material carried by the male part and having threads on its outer periphery for enabling it to be screwed into the bottom of the socket, said ring being tightly disposed in a groove on the lower end of the male part so that it may be screwed into the socket at the same time that the male part is inserted therein, a portion of said ring being arranged to extend below the lower end of said male part, thereby to permit lateral displacement of said portion when said male part is screwed into said socket.

FRANK J. HINDERLITER.